Feb. 8, 1927.   1,617,183
J. J. SNYMAN
MEANS FOR MARKING OUT LAWN TENNIS COURTS AND OTHER AREAS
FOR THE PLAYING OF GAMES, AND FOR OTHER SIMILAR PURPOSES
Filed Aug. 3, 1923
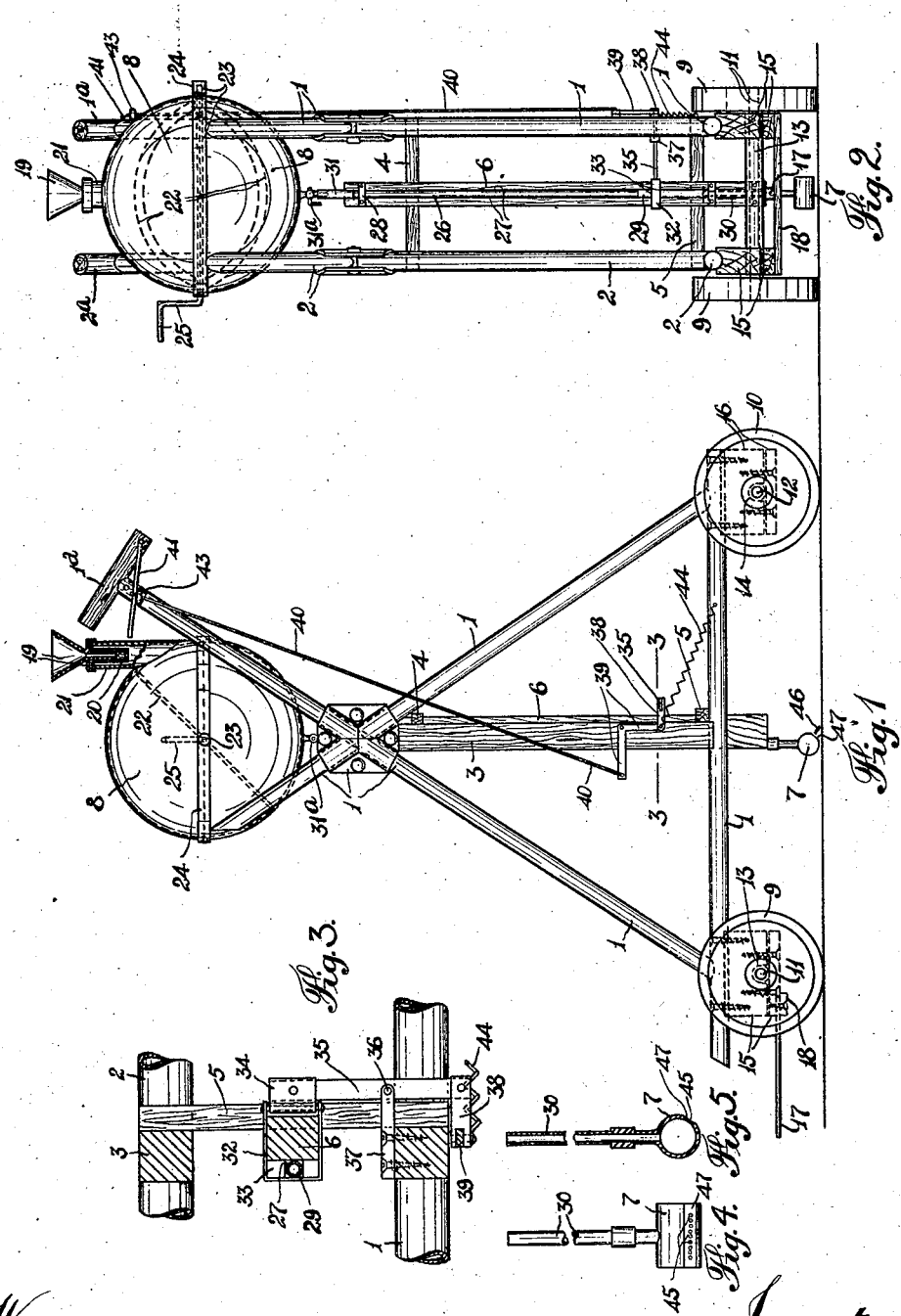
Witness:
Arthur Thompson
Inventor:
Johannes Jacobus Snyman Patented Feb. 8, 1927.

1,617,183

UNITED STATES PATENT OFFICE.

JOHANNES JACOBUS SNYMAN, OF JOHANNESBURG, TRANSVAAL, SOUTH AFRICA.

MEANS FOR MARKING OUT LAWN-TENNIS COURTS AND OTHER AREAS FOR THE PLAYING OF GAMES AND FOR OTHER SIMILAR PURPOSES.

Application filed August 3, 1923. Serial No. 655,516.

This invention relates to a means, apparatus or device primarily designed for marking out lawn tennis courts, and has for its object to construct an apparatus by means of which a straight and clearly defined line can be made or formed.

The apparatus can also be advantageously utilized for making lines in areas intended for the playing of other games, as well as for other similar purposes.

Apparatus according to this invention comprises a wheeled structure or framework carrying a receptacle for the whitening material or liquid which is to be employed for making the lines, a part or distributor for the whitening material which is provided with one or more rows of suitable small holes or passages, a part or parts providing a passage or conduit from the receptacle to said distributor, and means for opening and closing said passage to control the flow of the marking fluid from said receptacle to said perforated part or distributor. The perforated part or distributor is arranged and supported in suitable close proximity to the ground with the perforations preferably directed rearwardly or towards the back of the apparatus.

The controlling means preferably includes a rubber or other suitable piece of resilient piping which is interposed in or forms portion of the passage along which the marking fluid flows from the receptacle to the perforated part or distributor, with means for collapsing or pinching a portion of said rubber or resilient pipe, in order to close the passage, so that when the rubber pipe is allowed to expand, it produces or tends to produce such an effect as to cause the liquid to leave the distributor with greater force or with a spurt, and so precludes the possibility of the jets merging or joining and so forming an uneven or irregular line.

The receptacle will be provided with an inlet, preferably fitted with a funnel and strainer, and an arrangement for stirring the whitening or other marking liquid in the receptacle.

The wheeled vehicle may be provided centrally at the front with a pointer or indicator which will serve as a guide for the operator to facilitate his following any line or mark.

A tap may be provided in the passage leading from the receptacle to the distributor, for the purpose of shutting off the supply of the marking liquid when the apparatus is not in use.

In the embodiment of the invention shown by way of example in the accompanying drawings, Fig. 1 is a side part-sectional elevation of the apparatus.

Fig. 2 is a front elevation of Fig. 1.

Fig. 3 is an enlarged sectional detail, the section being taken on line 3—3 of Fig. 1, and Figs. 4 and 5 are rear elevation and sectional side elevations, respectively, of the distributor.

Constructed as shown in the drawings, the apparatus comprises a wheeled structure including the two vertical tubular side frames 1, 2, each fitted with a central vertical wooden upright 3. The side frames are connected together, through the medium of the uprights 3, by means of wooden bars 4, 5. 6 is an intermediate upright or post which is fixed to the bars 4, 5, and carries the distributor 7 and parts, hereinafter referred to, providing the passage between it and the receptacle 8. The side frames are provided with handles $1^a$, $2^a$, for propelling the apparatus by hand.

9 are the front wheels and 10 the rear wheels which are fixed on axles 11, 12, respectively. The axles run in the tubular bearings 13, 14, which are fixed in and are carried by the wooden blocks 15, 16, fixed to the bottom horizontal tubular members of each of the side frames 1, 2.

17 is the pointer or indicator which is fixed to a cross-piece 18 attached to the front blocks 15. The pointer 17 is placed centrally at the front of the wheeled structure in line with the centre of the distributor 7.

The receptacle 8 for the mixture of whitening and water or other marking liquid is shown of spherical shape constructed in halves and connected together by means of a band 24, by soldering or otherwise. Although I prefer to make the receptacle of spherical shape it is obvious that it may be made of cylindrical or any other suitable shape. The receptacle 8 is postioned intermediate the side frames 1, 2, and supported thereby and suitable fixed thereto.

19 is a removable filling funnel for the receptacle 8 and 20 a strainer into which the lower portion of the funnel 19 fits, the strainer being arranged in a branch 21 of the receptacle 8.

22 represents a pair of semi-circular arms or paddles fixed on a spindle 23 which is rotatably supported in the band or ring 24, and 25 is a handle for rotating said spindle 23 in order to stir the contents of the receptacle before the apparatus is put into use.

The parts providing the passage or conduit from the receptacle 8 to the distributor 7 include a piece of rigid pipe 26 fixed in a groove 27 in the front of the upright 6 and secured therein by a cleat or clamp 28, a piece of rubber or other suitable resilient tubing 29 fixed at its upper end to the lower end of pipe 26, and at its lower end to the upper end of the stem or tubular projection 30 of the distributor 7, and a piece of rubber or other suitable flexible tubing 31 which connects the upper end of the rigid pipe 26 with one side of the tap 31ᵃ, which latter is fixed to the bottom of the receptacle 8.

The means for collapsing or pinching portion of the rubber tubing 29 includes a bridle or U-shaped piece 32—see Fig. 3—which is adapted to work in a transverse horizontal groove 33 formed in the upright 6 across the groove 27, so as to engage with the portion of the tube 29 lying in said transverse groove 33. The bridle 32 is pivotally attached by means of a bracket or yoke 34 to one arm of a lever 35, 36 being the pivot for the lever 35, which pivot is carried by the arm 37 fixed to one of the side uprights 3. The other arm of the lever 35 has pivotally attached to it a link 38 which link, at its other end, is attached to a bell-crank lever 39 pivoted to the side upright 3. The other arm of the lever 39 is adapted to be actuated by the rod or cord 40 attached to it, from a handle or lever 41 pivoted at one end to the handle 1ᵃ and also supported by an eye-piece 43 fixed in the upper end of one of the members of the side frame 1. 44 is a spring fixed at one end to one end of the link 38 and at the other end to the horizontal tubular member of the side frame 1, which spring serves, when the handle 41 is released, to remove the pressure from the collapsible tube 29 and allow the marking liquid to flow freely down the passage from the receptacle 8 to the distributor 7.

The distributor 7 is shown in the form of a short cylinder closed at the ends and formed near the bottom and at the back with one row of rearwardly directed apertures or holes 45 through which the marking liquid passes on to the ground, as indicated at 46 in Fig. 1. The outside surface of the distributor 7, at the orifice of the holes, is preferably formed with a flat, as indicated at 47, so as to allow the fluid to flow freely from the holes and preclude the uniting of the jets.

In putting the device into operation, the marking liquid is introduced into the receptacle 8 through the funnel and strainer. The tap 31ᵃ is now opened to allow the liquid to flow by gravity down the passage and fill the distributor 7. The tube 29 is now collapsed by operating the handle 41 and the device is brought into position for use, the pressure on the collapsible tube 29 being now removed by releasing the handle 41. This allows of a strong initial flow and a continuous supply of the marking liquid to the distributor 7, which liquid flows through the apertures or perforations 45 in the form of a number of separate and distinct jets on to the ground or lawn. The device is simultaneously pushed forward, the indicator 17 being used to guide the vehicle in the desired direction along the line or mark.

If the device has been allowed to stand then the liquid contained in the receptacle 8 will be stirred by rotating the arms 22 before the tap 31ᵃ is opened.

What I claim as my invention and desire to protect by Letters Patent is:—

A device of the nature indicated, comprising a wheeled structure, a receptacle for the marking liquid carried by said structure, a distributor for the marking liquid arranged in close proximity to the ground and having a plurality of outlet apertures from which the marking liquid issues and is delivered directly on to the ground in the form of a plurality of separate jets, parts, including a resilient tube, providing a passage from the receptacle to said distributor, hand-actuated means for compressing said resilient tube to control the flow of the liquid along said passage to the distributor, and means inside the receptacle for stirring the marking liquid, as set forth.

In testimony whereof I have signed my name to this specification.

JOHANNES JACOBUS SNYMAN.